United States Patent
Chow et al.

(10) Patent No.: US 9,070,225 B2
(45) Date of Patent: Jun. 30, 2015

(54) INTERACTIVE DISPLAY ELEMENTS IN A VISUALIZATION COMPONENT

(75) Inventors: Kevin Chow, Wakefield, MA (US); Gary Look, Medford, MA (US); Prashant Singh, Burlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 235 days.

(21) Appl. No.: 13/251,584

(22) Filed: Oct. 3, 2011

(65) Prior Publication Data

US 2013/0083056 A1    Apr. 4, 2013

(51) Int. Cl.
*G09G 5/00* (2006.01)
*G06T 11/20* (2006.01)

(52) U.S. Cl.
CPC .................. *G06T 11/206* (2013.01)

(58) Field of Classification Search
CPC ........... G06F 17/30; G06F 3/048; G06F 7/06; G09G 5/00; G06T 17/05; G06T 17/005
USPC .......... 345/629–641, 428, 602, 610; 715/763; 707/705–778
See application file for complete search history.

(56) References Cited

U.S. PATENT DOCUMENTS

| | | | |
|---|---|---|---|
| 8,352,465 B1* | 1/2013 | Jing et al. | 707/723 |
| 8,510,510 B1* | 8/2013 | Patil et al. | 711/136 |
| 2006/0285152 A1* | 12/2006 | Skillen | 358/1.15 |
| 2007/0185651 A1* | 8/2007 | Motoyama et al. | 701/211 |
| 2008/0215235 A1* | 9/2008 | Strassenburg-Kleciak et al. | 701/200 |
| 2009/0183093 A1* | 7/2009 | Ducharme | 715/763 |
| 2010/0287207 A1* | 11/2010 | Motoyama | 707/803 |

FOREIGN PATENT DOCUMENTS

WO    WO 2005089434 A2 *    9/2005

* cited by examiner

*Primary Examiner* — Jason M Repko
*Assistant Examiner* — Michael Le
(74) *Attorney, Agent, or Firm* — Miles & Stockbridge P.C.

(57) ABSTRACT

One embodiment is directed to a computer program, embodied on a computer readable medium. The computer program is configured to control a processor to execute instructions. The instructions include receiving one or more files as input. The files may each include descriptions of different shapes. The instructions may further include interpreting each of the files as a layer of shapes, converting each of the shapes into an interactive element, layering the converted shapes onto one another to create a custom interactive display, and displaying the custom interactive display.

18 Claims, 7 Drawing Sheets

INTERACTIVE DISPLAY ELEMENTS IN A VISUALIZATION COMPONENT

FIELD

One embodiment is directed generally to a computer system, and in particular to a system for creating interactive display elements in a visualization component.

BACKGROUND INFORMATION

Visualization components include components for applications that allow users, such as software developers, to visualize and display data in meaningful ways. Generally, the types of items that can be displayed by visualization components are usually limited to a pre-defined set of items that are defined by the visualization component. In order to display other items that are not pre-defined and allow a user to interact with those items, some visualization components allow developers to import other images for display. However, the visualization component needs a mechanism for importing these images and converting them into interactive display objects that can be shown in the visualization component.

Previously, visualization components dealt with the issue of importing and converting items in one of two ways, both of which have shortcomings. Some visualization components import only certain types of data for display (e.g., a mapping component may only be able to accept certain types of geographic data). Under this restriction, the visualization component may be able to turn each item in the import data into an interactive display item (e.g., each province or state outlined in the map). However, this feature would be limited to only certain types of objects for display.

Another approach is to import an arbitrary image and allow the arbitrary image as a whole to be interactive. This approach is limiting when the image has different parts and an application developer wants each part to be interactive (e.g., in the case of a schematic that shows how to assemble a complex car engine). Therefore, these approaches are not suitable for all situations.

SUMMARY

One embodiment is directed to a computer program, embodied on a computer readable medium. The computer program is configured to control a processor to execute instructions. The instructions include receiving one or more files as input. The files may each include descriptions of different shapes. The instructions may further include converting each of the shapes into an interactive element that can be displayed by a visualization component.

DETAILED DESCRIPTION

One embodiment is directed to a visualization component that is configured to receive one or more files as input. In some embodiments, each of the files describe different shapes, forms, or figures. The files may be, for example, scalable vector graphics (SVG) files, Esri Shapefiles, or Oracle Spatial database files. The visualization component may then be configured to convert each of the shapes described in the files into an interactive element, or "custom region," that can be displayed by the visualization component.

Figure 1:
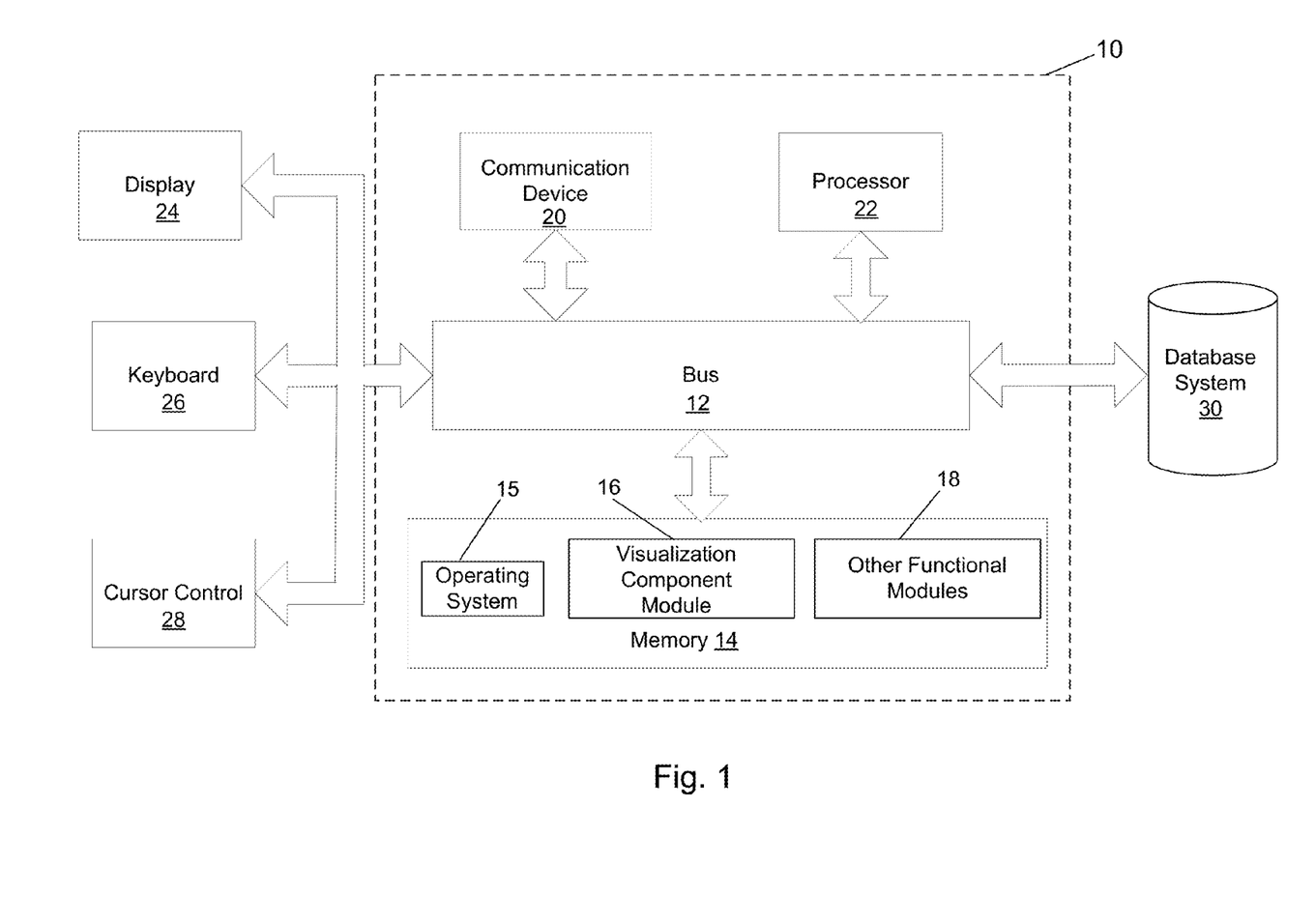
FIG. 1 illustrates a system according to one embodiment of the invention.

FIG. 1 illustrates a block diagram of a system 10 configured to create a custom region, according to one embodiment. System 10 includes a bus 12 or other communications mechanism for communicating information between components of system 10. Alternatively, the components of system 10 may communicate with each other directly without the use of bus 12.

System 10 also includes a processor 22, coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer readable media. System 10 further includes a communication device 20, such as a network interface card or other communications interface, to provide access to a network. As a result, a user may interface with system 10 directly or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information or data to a user, such as maps or diagrams, as will be discussed in more detail below. A keyboard 26 and a cursor control device 28, such as a computer mouse, are further coupled to bus 12 to enable a user to interface with system 10.

Processor 22 and memory 14 may also be coupled via bus 12 to a database system 30 and, thus, may be able to access and retrieve information stored in database system 30. Although only a single database is illustrated in FIG. 1, any number of databases may be used in accordance with certain embodiments. In some embodiments, database system 30 may store information related to displayed maps or figures, such as their dimensions, area, coordinates, and any other relevant attributes.

Figure 2A:
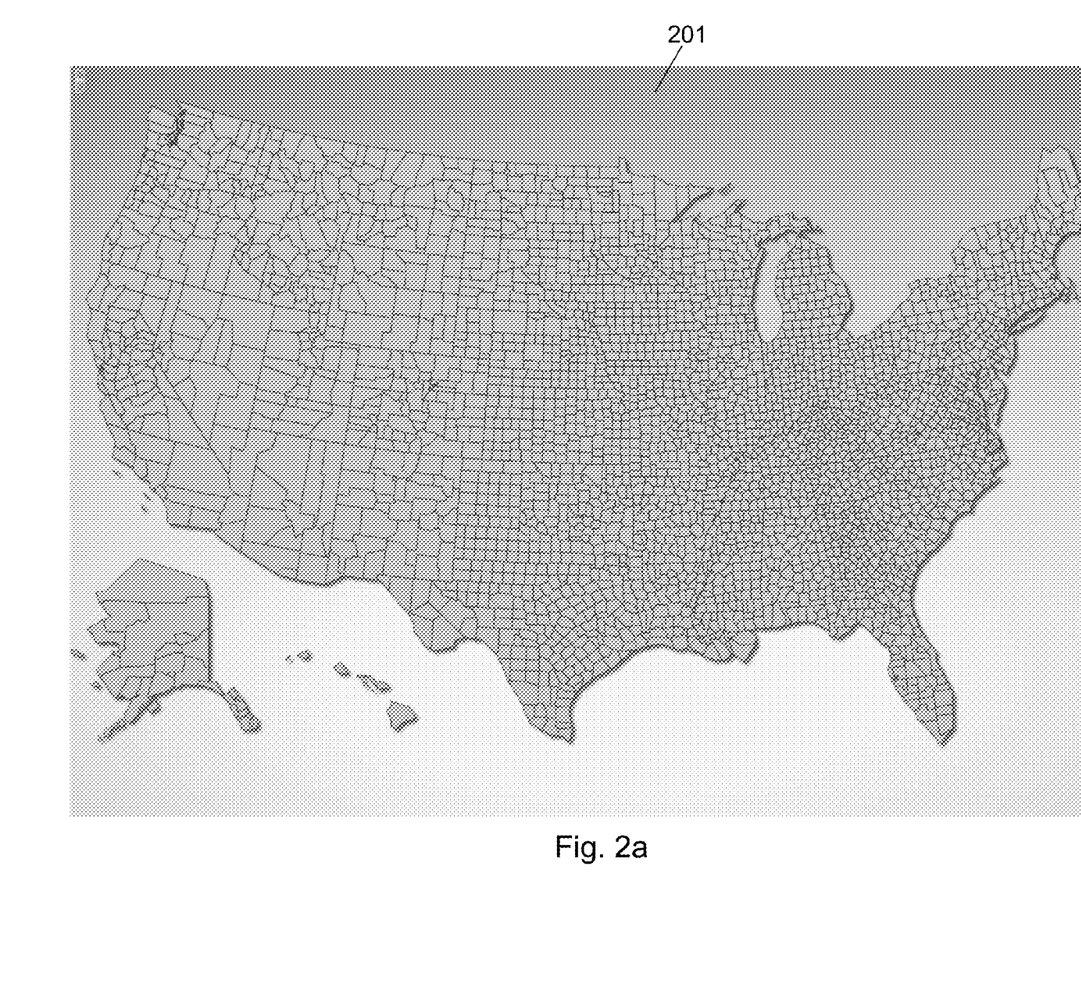
FIGS. 2a-2c illustrate examples of interactive maps according to an embodiment.
Figure 2B:
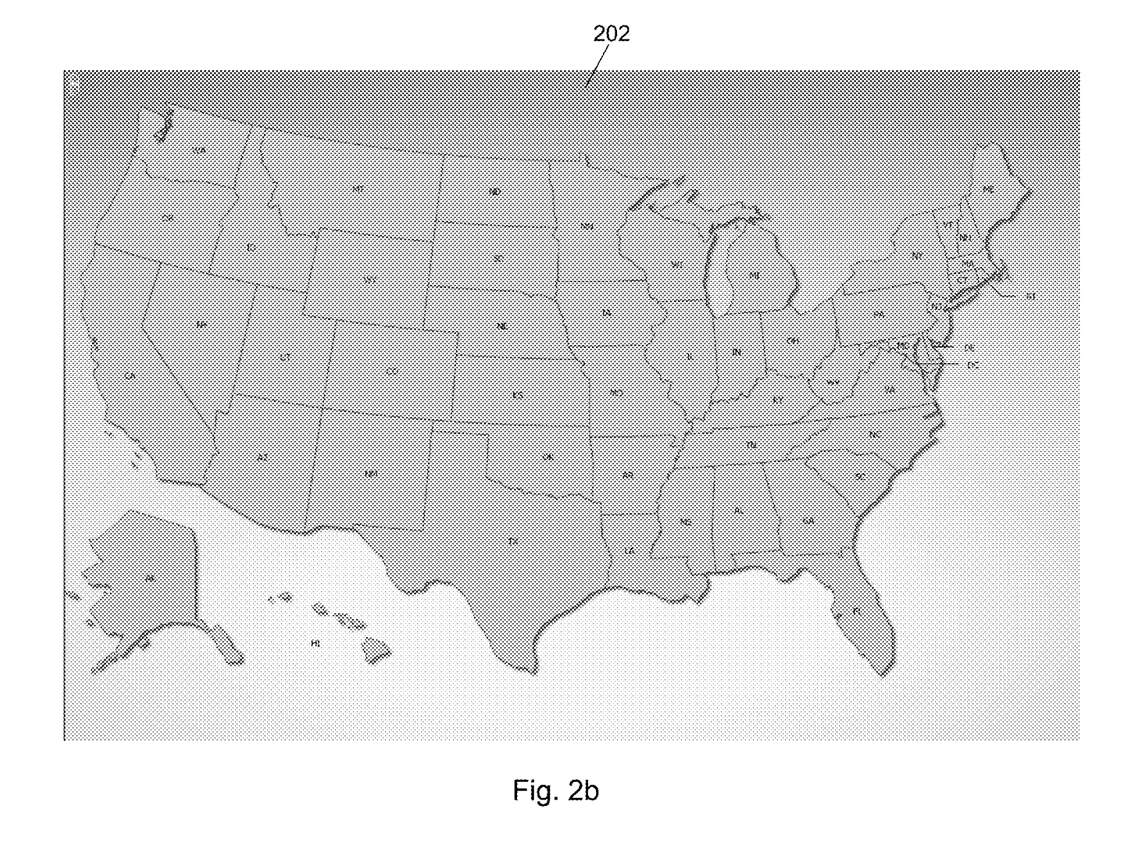
Figure 2C:
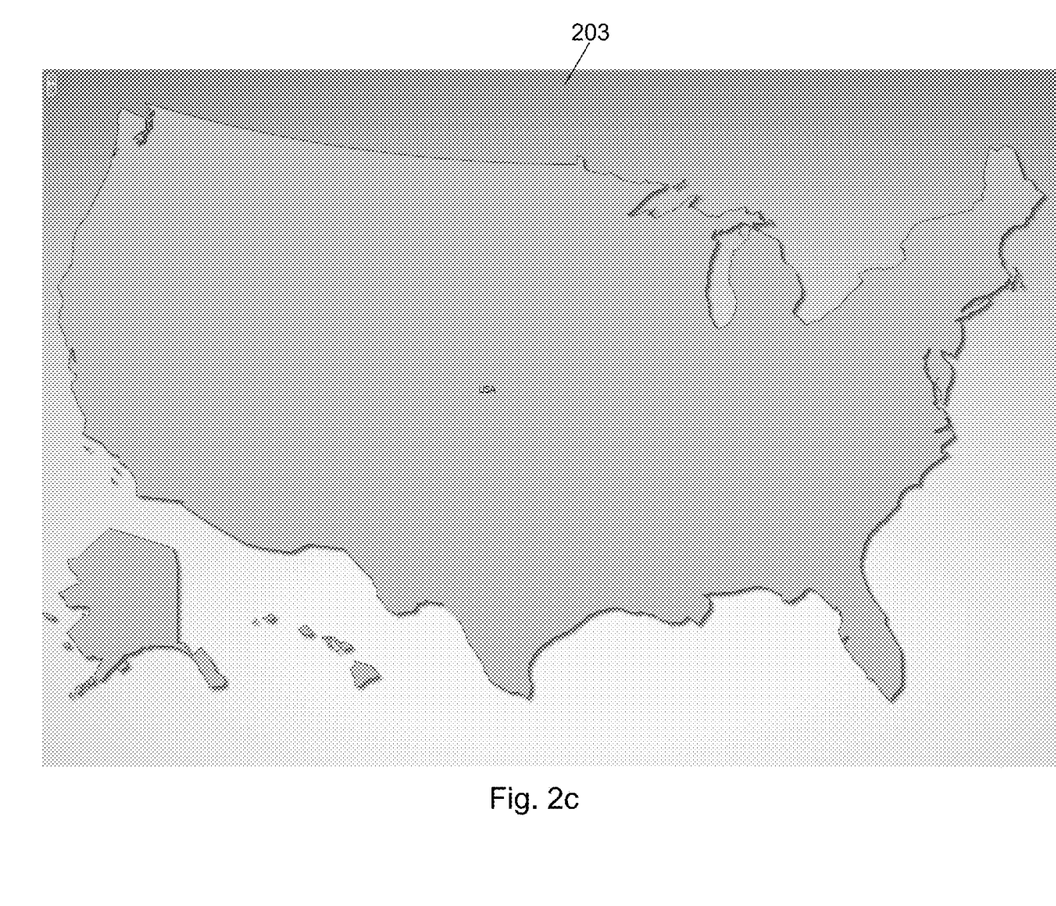
Figure 3:
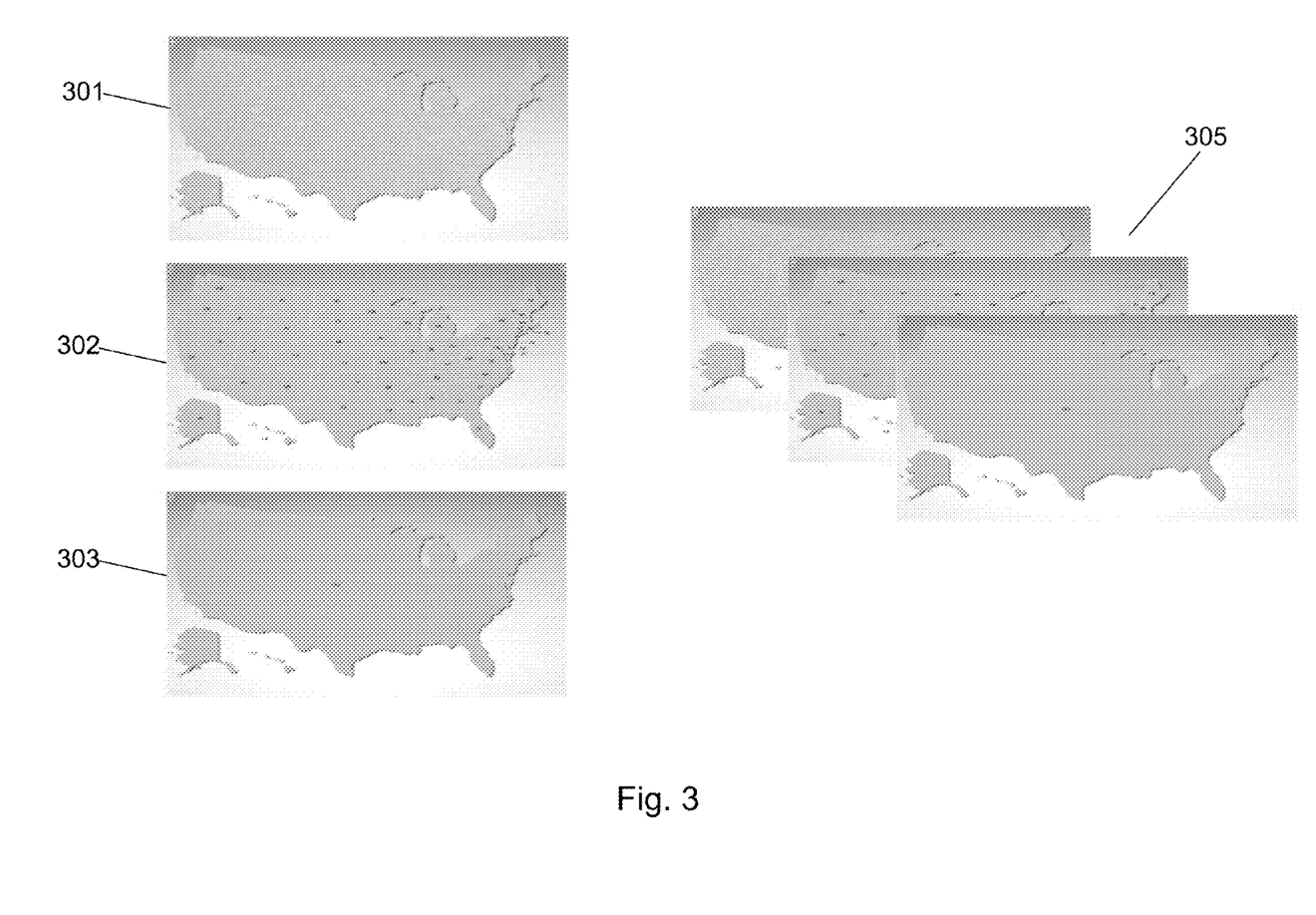
FIG. 3 illustrates an example of an interactive map according to another embodiment.
Figure 5A:
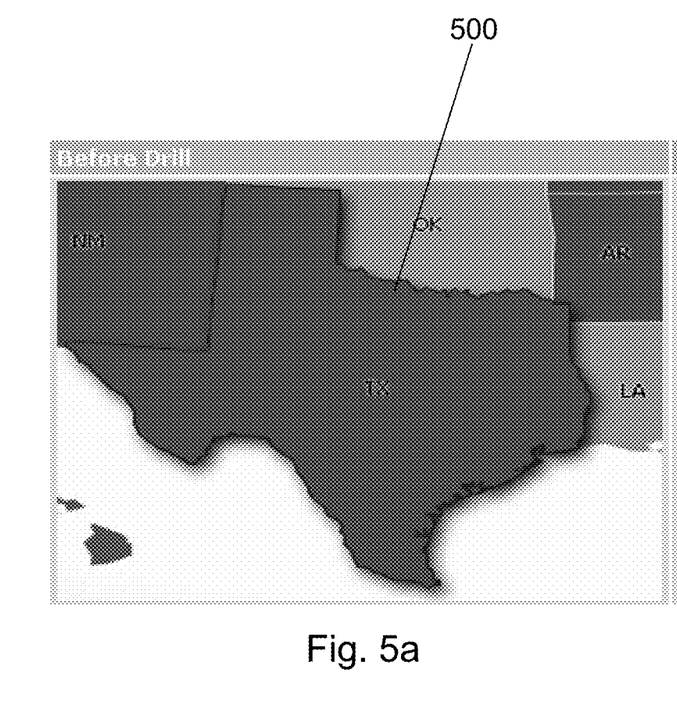
FIGS. 5a-5b illustrate another example of an interactive map according to one embodiment.
Figure 5B:
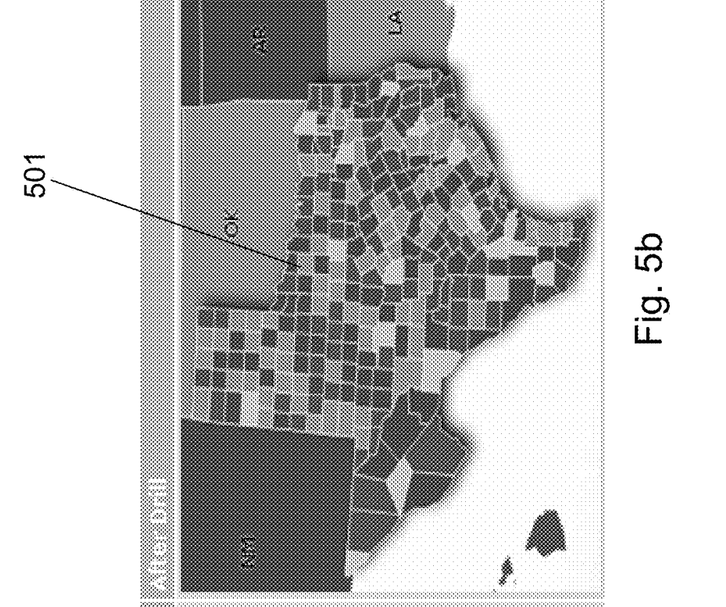

In one embodiment, memory 14 stores software modules that provide functionality when executed by processor 22. The modules may include an operating system 15 that provides operating system functionality for system 10. The memory may also store a visualization component module 16, which can provide the functionality for importing and converting interactive display objects, according to one embodiment. System 10 may also include one or more other functional modules 18 to provide additional functionality. In one embodiment, the functional modules 18 may include a visualization component, application, or interface. In another embodiment, the functional modules 18 may include a thematic map component. FIGS. 2, 3, and 5, which will be discussed in more detail below, illustrate examples of thematic maps that may be produced by a thematic map component, according to certain embodiments.

Database system 30 may include a database server and any type of database, such as a relational or flat file database. Database system 30 may store attributes related to the maps or regions. Database system 30 may also store any other data required by the visualization component module 16, or data associated with system 10 and its associated modules and components.

In certain embodiments, processor 22, visualization component module 16, and other functional modules 18 may be implemented as separate physical and logical units or may be implemented in a single physical and logical unit. Furthermore, in some embodiments, processor 22, visualization component module 16, and other functional modules 18 may be implemented in hardware, or as any suitable combination of hardware and software.

In one embodiment, visualization component module 16 is configured to control system 10 to perform a process of creating interactive display elements in a visualization component using imported drawing descriptions. Visualization component module 16 can receive or import one or more files as input. The files may include shape descriptions in a number of different formats, such as SVG, Esri Shapefiles, or Oracle Spatial database. The files may also include metadata about the described shapes. The metadata can include any type of data pertaining to the shapes. Visualization component module 16 may then create an input format used by the visualization component.

According to certain embodiments, when more than one file is received as input, each individual file can be interpreted as a layer of shapes. The layers may then be arranged in a spatial hierarchy and combined into one map, for example. The spatial hierarchy may include each of the layers of shapes, where each layer represents a level in the spatial hierarchy. Some benefits of the input format created by visualization component module 16 include the spatial hierarchy being represented in an efficient manner allowing for efficient navigation and rendering between different map layers. Also, additional metadata can be generated to support label placement for the map and/or shapes.

In some embodiments, visualization component module 16 includes a receiver configured to receive one or more files as input. Visualization component module 16 may also include a converter configured to convert shape descriptions that are included in the files into an interactive element that can be displayed by the visualization component.

FIGS. 2a-2c illustrate examples of shape descriptions that can be included in files imported by visualization component module 16, according to one embodiment. Although FIGS. 2a-2c, and FIG. 3 discussed below, illustrate maps of the United States, it should be noted that embodiments of the invention are not limited to such geographic maps, but can be applied to maps of other regions or objects, topological and geometric maps, as well as other types of charts, graphs, or visual depictions of data.

In the example illustrated in FIG. 2a, visualization component module 16 may import or receive a file describing counties in the United States 201. In the example illustrated in FIG. 2b, visualization component module 16 may import or receive a second file describing states in the United States 202. In the example illustrated in FIG. 2c, visualization component module 16 may import or receive a third file describing the United States national border 203. Then, as illustrated in FIG. 3, visualization component module 16 can create a United States counties layer 301, a United States states layer 302, and a United States national border layer 303. Visualization component module 16 may then combine all three layers 301, 302, and 303 into one custom map 305. The hierarchy for this custom map 305 would be United States national border>United States states>United States counties.

According to certain embodiments, if a user provides one file as input, the user may optionally specify rules for how the shapes in the input file can be aggregated to form larger shapes. These larger shapes may then constitute another layer. This process can be repeated to generate further layers. Therefore, in one embodiment, visualization component module 16 may receive a single file specifying a layer of United States counties, for example, and visualization component module 16 is able to aggregate the United States counties into a layer of United States states and then aggregate the United States states into a layer representing the United States national border. These three layers can then be combined into one custom map.

Figure 4:
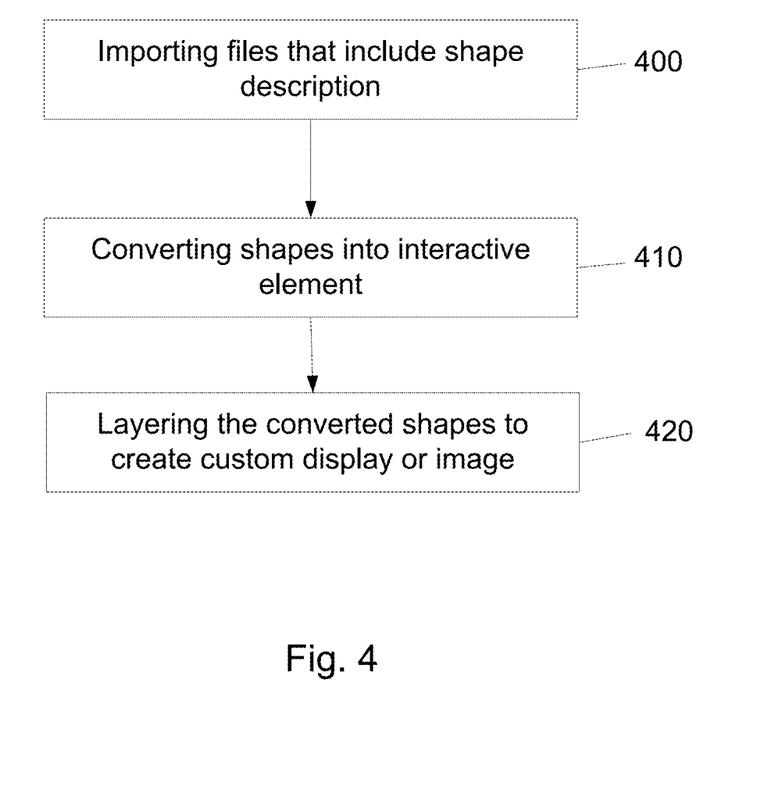
FIG. 4 illustrates a flow diagram of a method according to an embodiment.

FIG. 4 illustrates a flow diagram of a method for creating interactive custom regions, according to one embodiment. In certain embodiments, the functionality of the flow diagram of FIG. 4, is implemented by software stored in memory or other computer readable or tangible media, and executed by a processor. In other embodiments, the functionality may be performed by hardware (e.g., through the use of an application specific integrated circuit (ASIC), a programmable gate array (PGA), a field programmable gate array (FPGA), etc.), or any combination of hardware and software.

Referring to FIG. 4, the method includes, at 400, receiving or importing one or more files that include a description of at least one shape. In certain embodiments, the files may be received by visualization component module 16. The method then includes, at 410, converting each of the received shapes and/or their descriptions into an interactive element that can be displayed by a visualization component. The method may also include, at 420, layering the converted shapes or interactive elements onto one another to create a custom interactive display, such as a custom map. In other words, according to certain embodiments, each of the files may be interpreted as a layer of shapes and the layers are arranged in a spatial hierarchy. Once combined, the layers of shapes can be displayed as one map, for example.

As discussed above, the input files imported by visualization component module 16 can be in a number of different formats, including SVG, Esri Shapefiles, or Oracle Spatial database. In one embodiment, once the input files are received in any of these or other formats, visualization component module 16 is configured to convert each shape in the files into a path description that generically describes how the shape is drawn. Table 1 below generically lists the elements used to describe a path, according to one embodiment.

TABLE 1

| | |
|---|---|
| M, x, y | The M command ("move-to") starts a new subpath at the (x, y) coordinates that follow. |
| L, x, y | The L command ("line-to") draws a line from the current point to the (x, y) coordinates that follow. |
| Q, x1, y1, x, y | The Q command ("quadratic Bezier") draws a quadratic Bezier curve from the current point to (x, y) using (x1, y1) as a control point |
| C, x1, y1, x2, y2, x, y | The C command ("cubic Bezier") draws a cubic Bezier curve from the current point to (x, y) using (x1, y1) as the control point at the beginning of the curve and (x2, y2) as the control point at the end of the curve. |

TABLE 1-continued

| | |
|---|---|
| Z | Close the curve by drawing a line segment from the current point to the point defined in the last M command |

An example of a path description is as follows: ["M", 10.3, 10, "L", 12.12, 15.3, "L", 10, 15.01, "Q", 5, 10.4, 11.9, 10, "C", 23, 34.4, 25.9, 15, 7, 9, Z]. According to this example, the move-to command starts a subpath by "moving-to" point (10.3, 10). A line is then drawn from point (10.3, 10) to (12.12, 15.3), and then another line is drawn from (12.12, 15.3) to (10, 15.01). Next, a quadratic Bezier is drawn from (10, 15.01) to (11.9, 10) using (5, 10.4) as the control point. Then, a cubic Bezier curve is drawn from (11.9, 10) to (7, 9) using (23, 34.4) and (25.9, 15) as control points.

In one embodiment, the generic path description is stored in an array for later reference. The location of the path description in the array is then stored in a lookup table, along with other metadata about the shape. The lookup table may be specially structured to facilitate efficient drilling between shapes in different layers. The lookup table can contain multiple nested levels of information. According to certain embodiments, the top level of the lookup table contains the different layers in the map, indexed by the name of the layer. For instance, for the United States map example illustrated in FIG. 3, the lookup table may be structured as follows:

| | |
|---|---|
| "CountiesLayer" → | counties layer entry |
| "StatesLayer" → | states layer entry |
| "NationalBorderLayer" → | national border layer |

Each layer entry includes data for all the shapes in that layer. For example, the counties layer entry contains all the metadata for the United States counties. An example implementation is to have an organization scheme in which the counties layer entry is indexed by county ID, and then have the county ID map to all the metadata for that county, for example, as follows:

| | | |
|---|---|---|
| "CountiesLayer" → | "Essex County, MA" → "King County, WA" "Alameda County, CA" | various metadata for Essex County |

Further, embodiments of the invention support a drilling operation such that, given a shape in any layer, a user can drill down from that shape and see all the shapes from the next layer below. Returning to the United States map example discussed above, FIG. 5 illustrates a section of the map before and after a drilling operation. In particular, FIG. 5a shows a map of Texas 500 prior to drilling and FIG. 5b shows the state of Texas 501 after a user selected the state and drilled down to display the counties within Texas.

Embodiments of the invention are able to facilitate efficient processing when navigating between different layers in a map or image. For instance, in the United States map example, instead of mapping the county ID to the metadata for that county, the index keys in the county layer are actually the ID for the parents of the shapes in that layer. These IDs then map to a lookup table that maps county ID to the metadata for each county. By organizing the data in this manner, users can quickly drill down and display the shapes in layer i+1 that make up any given shape in layer i. For example, in the case of the United States counties, the parents of the counties are the US states. Thus, the counties layer entry is actually indexed by the ID for US states as follows:

| | | | |
|---|---|---|---|
| "NationalBorderLayer" → national border layer | | | |
| "StatesLayer" → states layer entry | | | |
| "CountiesLayer" → | "MA" → | "Essex County" → | location of path description in path labeling metadata other metadata such as population |
| | | "Middlesex County" → | location of path description in path labeling metadata other metadata such as population |
| | "WA" → | "King County" | |
| | "CA" → | "Alameda County" | |

The labeling metadata for each shape can either be provided with the input files, or can be generated automatically by visualization component module 16.

In view of the above, embodiments of the invention are configured to allow a visualization component to import content from files and convert descriptions of the content into an interactive element that can be displayed by the visualization component. The interactive elements that are produced are able to have the same interactive features as the ones that are pre-defined or pre-packaged within the visualization component. As a result, each of the individual items in an arbitrary image can be converted into fully interactive display elements that can be displayed by the visualization component.

It should be noted that many of the functional features described in this specification have been presented as modules, applications or the like, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code or algorithm could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer program, embodied on a non-transitory computer readable medium, the computer program, when executed by a processor, configured to function as a visualization component and execute instructions, comprising:
receiving one or more files as input, wherein the files each comprise at least one shape description;
interpreting each of the files as a layer of shapes;
converting each of the shapes into an interactive element;
layering the converted shapes onto one another to create a custom interactive display; and
displaying the custom interactive display by the visualization component;
wherein the layered shapes are arranged as a spatial hierarchy that allows drilling down from a first layer to a second layer that is hierarchical lower than the first layer, the drilling down comprising, in response to a selection of a first shape in the first layer, showing all shapes in the second layer that are hierarchically lower than the first shape;
wherein a lookup table comprises an entry for each of the layer of shapes, and an entry for each second layer shape comprises an index key that comprises a parent identification of a corresponding parent shape in the first layer, and the parent identification is mapped to a child identification of the second layer shape, and the child identification is mapped to a location of a path description of the second layer shape and metadata for the second layer shape, wherein the path description of the second layer shape is stored in a separate array;
wherein when drilling down so that the second layer shapes visually replace the first layer shapes, the identification of the second layer shapes is obtained from the lookup table and the path description of the second layer shapes is obtained from the separate array.

2. The computer program according to claim 1, wherein the converting comprises converting each shape into a path description that generically describes how the shape is drawn.

3. The computer program according to claim 1, wherein the custom interactive display comprises a United States national borders layer, a United States states layer, and a United States counties layer.

4. The computer program according to claim 3, further comprising storing the path description in an array.

5. The computer program according to claim 4, further comprising:
storing a location of the path description within the array in the lookup table; and
storing metadata about the shape in the lookup table;
wherein the identification is mapped to the lookup table.

6. The computer program according to claim 1, wherein the files comprise at least one of an SVG file, Ersi Shapefiles, or Oracle Spatial database files.

7. An apparatus, comprising:
a receiver configured to receive one or more files as input, wherein the files each comprise at least one shape description; and
a visualization component module configured to:
interpret each of the files as a layer of shapes,
convert each of the shapes into an interactive element, and
layer the converted shapes onto one another to create a custom interactive display;
wherein the layered shapes are arranged as a spatial hierarchy that allows drilling down from a first layer to a second layer that is hierarchical lower than the first layer, the drilling down comprising, in response to a selection of a first shape in the first layer, showing all shapes in the second layer that are hierarchically lower than the first shape;
wherein a lookup table comprises an entry for each of the layer of shapes, and an entry for each second layer shape comprises an index key that comprises a parent identification of a corresponding parent shape in the first layer, and the parent identification is mapped to a child identification of the second layer shape, and the child identification is mapped to a location of a path description of the second layer shape and metadata for the second layer shape, wherein the path description of the second layer shape is stored in a separate array;
wherein when drilling down so that the second layer shapes visually replace the first layer shapes, the identification of the second layer shapes is obtained from the lookup table and the path description of the second layer shapes is obtained from the separate array.

8. The apparatus according to claim 7, wherein the visualization component module is further configured to display the custom interactive display.

9. The apparatus according to claim 8, wherein the layers of shapes are combined for display as one image.

10. The apparatus according to claim 8, wherein the visualization component module is further configured to convert each shape into a path description that generically describes how the shape is drawn.

11. The apparatus according to claim 10, wherein the apparatus is configured to store the path description in an array.

12. The apparatus according to claim 11, wherein the apparatus is configured to store a location of the path description within the array in the lookup table, and to store metadata about the shape in the lookup table;
wherein the identification is mapped to the lookup table.

13. A method for creating interactive display elements in a visualization component, the method comprising:
receiving, at the visualization component, one or more files as input, wherein the files each comprise at least one shape description;
interpreting each of the files as a layer of shapes;
converting each of the shapes into an interactive element;
layering the converted shapes onto one another to create a custom interactive display; and
displaying the custom interactive display by the visualization component;
wherein the layered shapes are arranged as a spatial hierarchy that allows drilling down from a first layer to a second layer that is hierarchical lower than the first layer, the drilling down comprising, in response to a selection of a first shape in the first layer, showing all shapes in the second layer that are hierarchically lower than the first shape;
wherein a lookup table comprises an entry for each of the layer of shapes, and an entry for each second layer shape comprises an index key that comprises an parent identification of a corresponding parent shape in the first layer, and the parent identification is mapped to a child identification of the second layer shape, and the child identification is mapped to a location of a path description of the second layer shape and metadata for the second layer shape, wherein the path description of the second layer shape is stored in a separate array;

wherein when drilling down so that the second layer shapes visually replace the first layer shapes, the identification of the second layer shapes is obtained from the lookup table and the path description of the second layer shapes is obtained from the separate array.

14. The method according to claim 13, wherein the converting comprises converting each shape into a path description that generically describes how the shape is drawn.

15. The method according to claim 13, wherein the displaying comprises displaying a custom interactive display comprising a United States national borders layer, a United States layer, and a United States counties layer.

16. The method according to claim 13, further comprising interpreting each of the files as a layer of shapes.

17. The method according to claim 14, further comprising:
storing a location of the path description within an array in the lookup table; and
storing metadata about the shape in the lookup table;
wherein the identification is mapped to the lookup table.

18. The method according to claim 16, further comprising combining the layers of shapes for display as one image.

* * * * *

UNITED STATES PATENT AND TRADEMARK OFFICE
CERTIFICATE OF CORRECTION

| | | |
|---|---|---|
| PATENT NO. | : 9,070,225 B2 | Page 1 of 1 |
| APPLICATION NO. | : 13/251584 | |
| DATED | : June 30, 2015 | |
| INVENTOR(S) | : Chow et al. | |

It is certified that error appears in the above-identified patent and that said Letters Patent is hereby corrected as shown below:

IN THE CLAIMS

In column 7, line 65, in Claim 6, delete "Ersi Shapefiles," and insert -- Esri Shapefiles, --, therefor.

In column 9, line 20, in Claim 15, before "layer," insert -- states --.

Signed and Sealed this
First Day of March, 2016

Michelle K. Lee
*Director of the United States Patent and Trademark Office*